United States Patent
Linton et al.

(10) Patent No.: US 11,178,117 B2
(45) Date of Patent: Nov. 16, 2021

(54) SECURE MULTIPARTY DETECTION OF SENSITIVE DATA USING PRIVATE SET INTERSECTION (PSI)

(71) Applicant: International Business Machines Corporation, Armonk, NY (US)

(72) Inventors: Jeb R. Linton, Manassas, VA (US); John Behnken, Hurley, NY (US); John Melchionne, Kingston, NY (US); Dennis Kramer, Siler City, NC (US); Michael Amisano, East Northport, NY (US); Michael T. Fiori, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 16/223,191

(22) Filed: Dec. 18, 2018

(65) Prior Publication Data

US 2020/0195618 A1    Jun. 18, 2020

(51) Int. Cl.
*H04L 29/06* (2006.01)
*G06F 9/54* (2006.01)
*G06F 21/60* (2013.01)

(52) U.S. Cl.
CPC .......... *H04L 63/0428* (2013.01); *G06F 9/54* (2013.01); *G06F 21/602* (2013.01)

(58) Field of Classification Search
CPC ....... H04L 63/0428; G06F 9/54; G06F 21/602
See application file for complete search history.

(56) References Cited

U.S. PATENT DOCUMENTS

| 9,077,539 | B2  |   | 7/2015 | Kamara et al. |              |
|-----------|-----|---|--------|---------------|--------------|
| 9,141,823 | B2  | * | 9/2015 | Dawson        | G06F 21/6227 |
| 9,245,150 | B2  | * | 1/2016 | Grubel        | H04L 63/105  |
| 9,288,056 | B1  | * | 3/2016 | Spagnola      | H04L 9/3236  |
| 9,355,257 | B2  | * | 5/2016 | Chari         | G06F 21/53   |

(Continued)

FOREIGN PATENT DOCUMENTS

| WO | 2015095463 A1 | 6/2015 |
| WO | 2017160317 A1 | 9/2017 |

OTHER PUBLICATIONS

Camenisch, et al., "Private intersection of certified sets," Financial Cryptography, 2009.

(Continued)

*Primary Examiner* — Lynn D Feild
*Assistant Examiner* — Viral S Lakhia
(74) *Attorney, Agent, or Firm* — Jeffrey S. LaBaw; David H. Judson (57) ABSTRACT

A method, apparatus and computer program product to detect whether specific sensitive data of a client is present in a cloud computing infrastructure is implemented without requiring that data be shared with the cloud provider, or that the cloud provider provide the client access to all data in the cloud. Instead of requiring the client to share its database of sensitive information, preferably the client executes a tool that uses a cryptographic protocol, namely, Private Set Intersection (PSI), to enable the client to detect whether their sensitive information is present on the cloud. Any such information identified by the tool is then used to label a document or utterance, send an alert, and/or redact or tokenize the sensitive data.

21 Claims, 4 Drawing Sheets

(56) References Cited

U.S. PATENT DOCUMENTS

| | | | |
|---|---|---|---|
| 9,378,382 B1* | 6/2016 | Swamidass | G06F 21/6245 |
| 9,462,044 B1* | 10/2016 | Preibisch | H04L 63/0823 |
| 95,316,691 | 12/2016 | Gero et al. | |
| 9,665,722 B2* | 5/2017 | Nagasundaram | G06F 21/6254 |
| 9,942,032 B1* | 4/2018 | Kornaropoulos | H04L 9/3236 |
| 10,089,484 B2* | 10/2018 | Willis | H04L 63/08 |
| 10,162,982 B2* | 12/2018 | de Oliveira | H04L 67/10 |
| 10,361,859 B2* | 7/2019 | Clark | H04L 9/3239 |
| 10,693,635 B2* | 6/2020 | Yuan | H04L 9/0894 |
| 2013/0246802 A1* | 9/2013 | Kerschbaum | H04L 9/0643 713/189 |
| 2015/0149763 A1* | 5/2015 | Kamara | H04L 63/0428 713/150 |
| 2015/0341326 A1* | 11/2015 | Premnath | H04L 63/062 713/171 |
| 2016/0345208 A1* | 11/2016 | Gates | G06Q 10/02 |
| 2017/0235972 A1* | 8/2017 | Mattsson | G06F 21/6272 726/30 |
| 2018/0103037 A1* | 4/2018 | Mullender | H04L 63/101 |
| 2018/0189485 A1* | 7/2018 | Jain | G06F 21/602 |
| 2018/0189501 A1* | 7/2018 | Ogawa | G06F 21/6227 |
| 2018/0373882 A1* | 12/2018 | Veugen | G06F 21/602 |
| 2019/0058696 A1* | 2/2019 | Bowman | H04L 9/3236 |
| 2019/0073473 A1* | 3/2019 | VanderLeest | G06F 21/6218 |
| 2019/0236287 A1* | 8/2019 | Remy | G06F 21/602 |
| 2019/0319968 A1* | 10/2019 | Mehta | H04L 63/1416 |
| 2019/0370468 A1* | 12/2019 | Soby | G06F 21/577 |
| 2020/0327252 A1* | 10/2020 | McFall | G06F 21/602 |

OTHER PUBLICATIONS

De Cristafo, et al., "Practical Private Set Protocols with linear computational and bandwidth complexity," 2010.

Huang, et al., "Private Set Intersection: Are Garbled circuits better than custom protocols?", NDSS Symposium 2012, Feb. 6, 2012.

International Search Report and Written Opinion, PCT/IB2019/060910, dated Apr. 20, 2020.

* cited by examiner

SECURE MULTIPARTY DETECTION OF SENSITIVE DATA USING PRIVATE SET INTERSECTION (PSI)

BACKGROUND OF THE INVENTION

Technical Field

This disclosure relates generally to identifying and preventing sensitive data leakage in a computing environment.

Background of the Related Art

When using cognitive systems that deal with large amounts of textual data, users in regulated industries (e.g., hospitals, financial institutions, and other regulated clients) have a need to detect whether sensitive data, such as Personally Identifying Information (PII), Protected Health Information (PHI) or the like, has been placed in a computing system implemented in a third party computing environment, such as a network-accessible cloud computing infrastructure. Thus, for example, these types of organizations possess definitive lists of their clients' names and other sensitive information, but they do not want to put those lists into any cloud system. One approach to protecting against disclosure of such sensitive information is to use known techniques, such as Data Loss Prevention (DLP) systems, which can store comprehensive databases of personal information and then monitor systems to detect potential leakage of such information. Although these types of systems work well for their intended purposes, they are often complex to implement and expensive to operate. Further, they do not address the requirement that enterprises desire assurance from their cloud providers that such information is not on the cloud.

DLP and other known security tools and methods typically use sophisticated techniques to determine whether such sensitive data is leaked or otherwise present on the cloud. In one common approach, a statistical classifier is trained (e.g., using machine learning), with the resulting model applied to detect for the sensitive data in question. But such detection (after-the-fact and typically occurring in the cloud) cannot approach the accuracy (presumably at or near 100%) that a local rules-based system with access to a full client database might provide.

BRIEF SUMMARY

According to this disclosure, a method to detect whether specific sensitive data of a client is present in a cloud computing infrastructure is implemented without requiring that data be shared with the cloud provider, or that the cloud provider provide the client access to the data its stores in the cloud, even on behalf of the client. Instead of requiring the client to share its database of sensitive information, or requiring the cloud provider to expose access to a corpus of information that it stores in the cloud, the client and provider collaboratively determine whether sensitive data of interest to the client is found in some portion of the cloud data (typically an index). This determination is made even while retaining the sensitive data of interest as private to the client and the index as private to the cloud provider. To this end, each party executes a tool that uses a cryptographic protocol, e.g., a Private Set Intersection (PSI), to enable a party (whether provider or client, or perhaps both) to detect whether the client's sensitive information is present on the cloud. Information identified by the tool is then used to label a document or utterance, send an alert, and/or redact or tokenize the sensitive data.

According to a more specific aspect, this disclosure describes a method to protect data that is carried out in association with a cloud computing environment, the cloud computing environment comprising a data store in which a corpus of information is received and stored. The method begins by identifying a first set of data associated with the corpus of information and private to the cloud computing environment. The first set of data may be an index of the corpus of information. Upon receipt of a request from an entity, a detection technique is then implemented. The entity has a second set of data, and wherein the second set of data is of interest to the entity and private to the entity. Sometimes the second set of data is referred to as the entity's "sensitive data." An example set of data may be a secret list of words or phrases. The first set of data is private to the provider while the second set of data is private to the entity; stated another way, typically the entity does not know the first set of data and the provider does not know the second set of data. Nevertheless, the parties collaboratively execute a cryptographic protocol to detect presence in the first set of data of any of the second set of data of interest to the entity. The cryptographic protocol is executed by evaluating a given cryptographic function over the first and second sets of private data without enabling the entity access to the corpus of information or the first set of private data. Preferably, the cryptographic protocol is a Private Set Intersection (PSI) that the provider executes collaboratively with the entity, e.g., using a Garbled circuit implemented using an oblivious transfer cryptographic primitive as the given cryptographic function. Upon detecting in the first set of data any of the second set of data of interest to the entity, a given action is taken. The given action typically is one of: providing an alert, labeling the detected information, applying a token to the detected information, and redacting the detected information.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
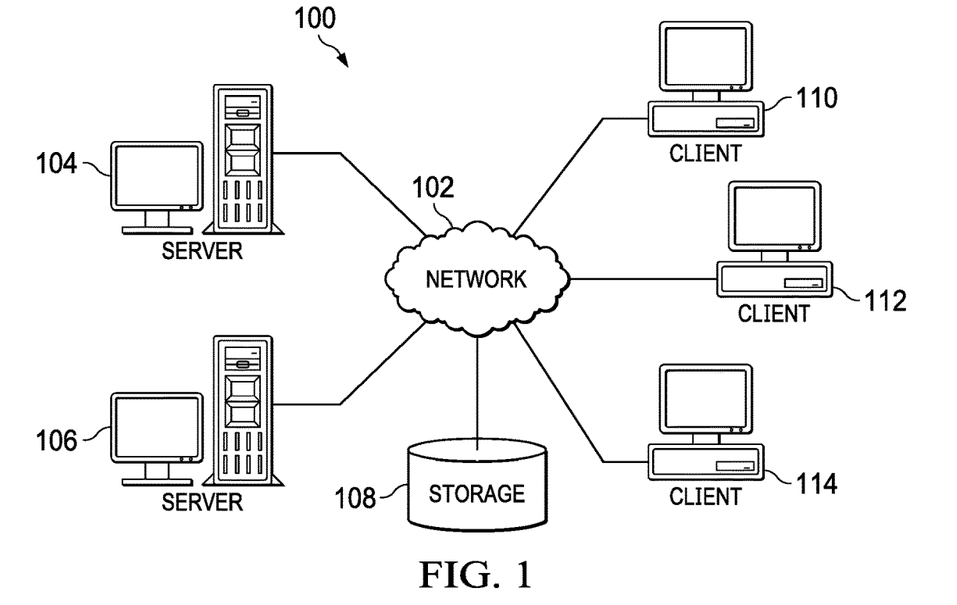
FIG. 1 depicts an exemplary block diagram of a distributed data processing environment in which exemplary aspects of the illustrative embodiments may be implemented.
Figure 2:
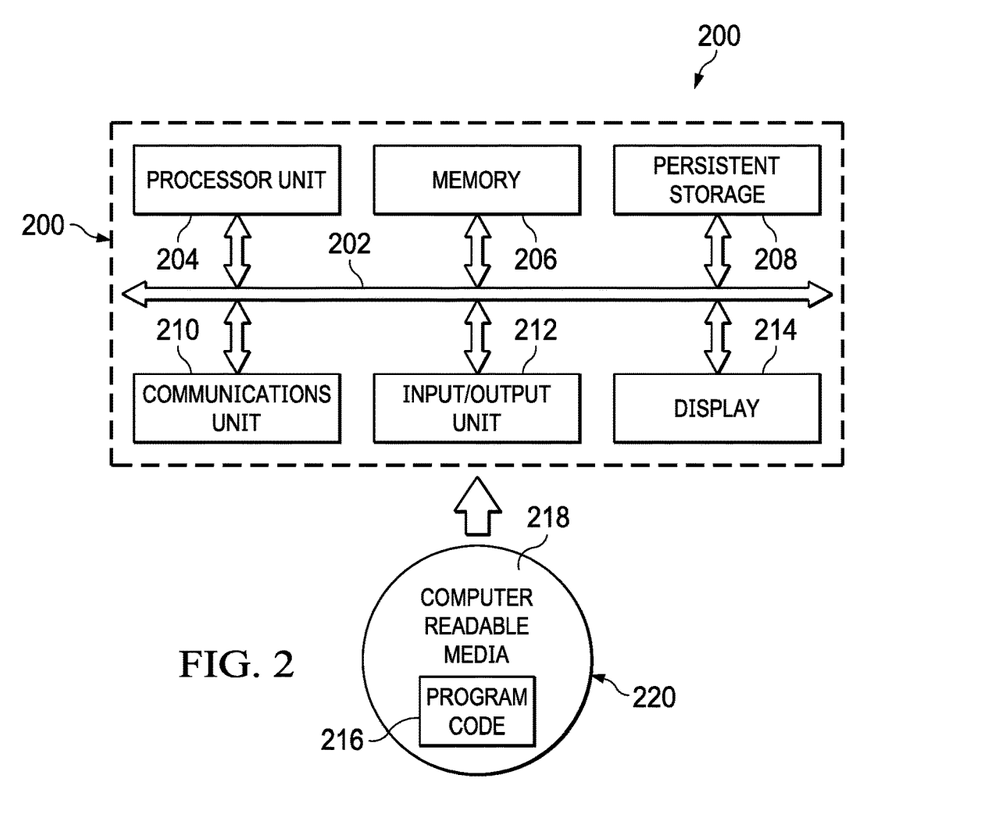
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
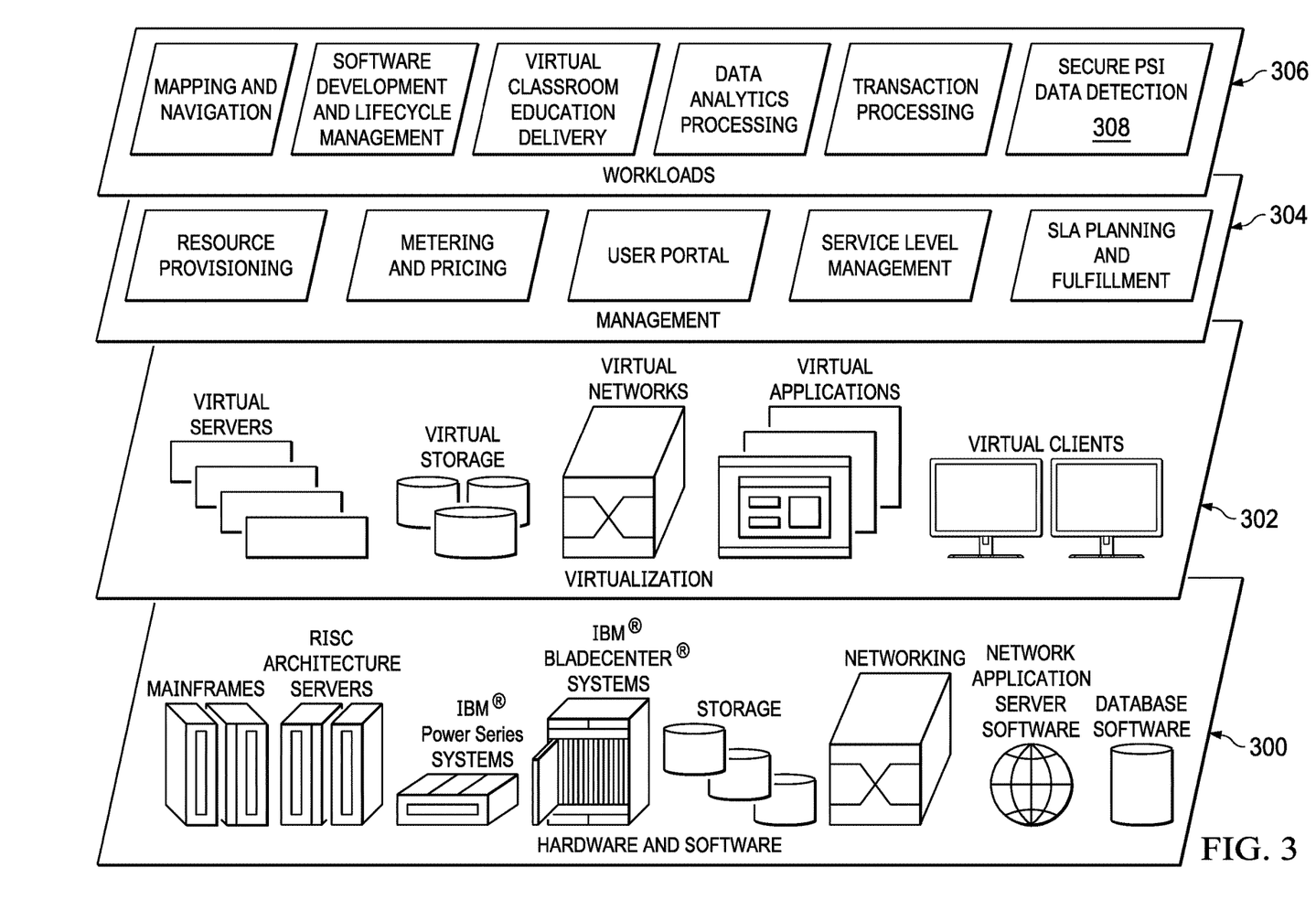
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, a secure PSI-data detection technique 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

Figure 4:
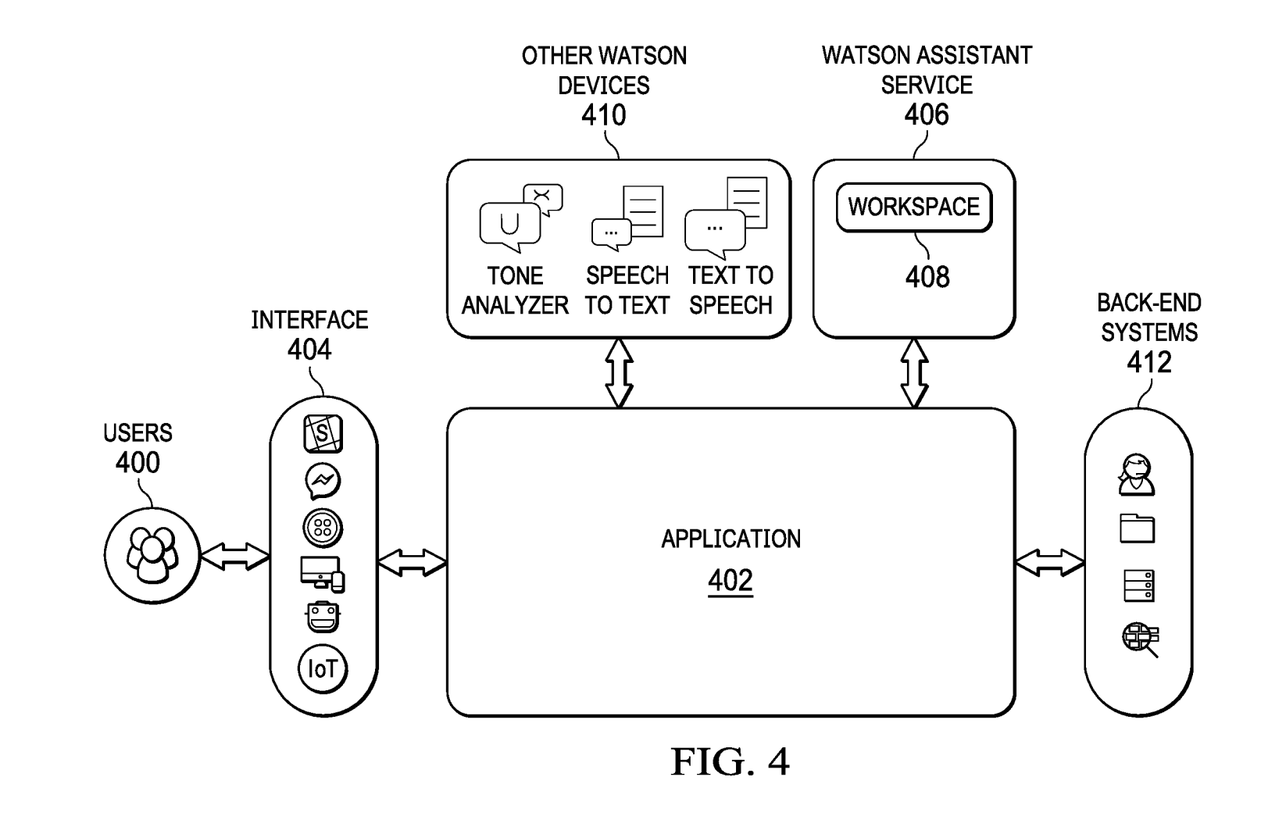
FIG. 4 is a representative cognitive services computing environment in which the techniques of this disclosure may be implemented.

In one embodiment, the technique of this disclosure is implemented in association with a cloud computing infrastructure (IBM Cloud) that supports cognitive services, such as IBM® Watson™ Assistant (formerly Watson Conversation). Watson Assistant may be implemented in association with an enterprise's cloud application that is supported in a cloud computing infrastructure, such as described above with respect to FIG. 3. FIG. 4 depicts a representative implementation. In this example, users 400 interact with the cloud application 402 through a user interface 404, e.g., a simple chat window, a mobile app, a robot with a voice interface, etc. The application 402 sends the user input to the Watson Assistant service 406. The application 402 then connects to a workspace, 408, which is a container for dialog flow and training data. The service 406 interprets the user input, directs the flow of the conversation, and gathers information that it needs. Additional Watson services 410, such as Tone Analyzer or Speech-to-Text, may be connected as needed, to analyze user input. In addition, the application 402 also can interact with enterprise back-end systems 412, e.g., based on the user's intent and additional information. Using the architecture, the enterprise can program multi-turn dialog and provide response variations based on different conditions, collect and validate information, add handlers for off-topic queries, enable users to browse from a catalog of already configured customer service and industry content packs to save time and start faster, provide analytics and recommendations that reveal insights from conversations and tailor the enterprise's training of the Watson service, protect generated insights, and the like.

In this approach, the enterprise implements a conversation (with Watson) by configuring a workspace using a graphical environment. During this process, the enterprise sets up training data and dialog for the conversation. The training data typically comprises artifacts, namely, intents (goals that users have when they interact with the service) and entities (a term or object that provides context for an intent). As training data is added, a natural language classifier is automatically added to the workspace, and it is trained to understand the types of requests that the service should listen for and respond to. Using a dialog tool, the enterprise can build a dialog flow that incorporates intents and entities.

Typically, the dialog flow is represented graphically in the tool as a tree. Once configured, the workspace is deployed by connecting it to a front-end user interface, social media or a messaging channel.

The above-described commercial implementation is not intended to be limited, but rather is simply one representative embodiment of a client application supported in a cloud computing environment and that interacts with a cognitive service.

Private Set Intersection A Private Set Intersection (PSI) protocol enables two parties, each with a private set of data, to securely compute the intersection of their data sets. This type of protocol allows mutually untrusted parties to compute jointly the intersection of their private input sets. Most PSI schemes are single-output, meaning that one of the parties receives the output of the intersection while the other does not; other PSI schemes are mutual, wherein the intersection is output to both parties. PSI protocols have been implemented in various use cases, such as online recommendation services.

Representative PSI protocol implementations may be based on one or more cryptographic protocols. These include, without limitation, Yao-construct Garbled circuits, and Partially Homomorphic Encryption.

Secure Regulated Data Protection Using a Cryptographic PSI Protocol

With the above as background, the subject matter of this disclosure is now described. As noted above, this disclosure describes a method and system to protect data that is carried out in association with a cloud computing environment, the cloud computing environment comprising a data store in which a corpus of information is received and stored. The method begins by identifying a first set of data associated with the corpus of information and private to the cloud computing environment. The notion of identifying should be broadly construed as generating, receiving, obtaining or otherwise building the first set of data. The first set of data may be generated in advance, or on-the-fly in response to a given occurrence, such as a receipt of a request. According to the method, and upon receipt of a request from entity, a detection technique is then implemented. The entity has a second set of data, and wherein the second set of data is of interest to the entity and private to the entity. Sometimes the second set of data is referred to as the entity's "sensitive data." An example set of data may be a secret list of words or phrases. The first set of data is private to the provider while the second set of data is private to the entity; stated another way, typically the entity does not know the first set of data and the provider does not know the second set of data. Nevertheless, the parties collaboratively execute a cryptographic protocol to detect presence in the first set of data of any of the second set of data of interest to the entity. The cryptographic protocol is executed by evaluating a given cryptographic function over the first and second sets of private data without enabling the entity access to the corpus of information or the first set of private data. Preferably, the cryptographic protocol is a Private Set Intersection (PSI) that the provider executes collaboratively with the entity, e.g., using a Garbled circuit implemented using an oblivious transfer cryptographic primitive as the given cryptographic function. Upon detecting in the first set of data any of the second set of data of interest to the entity, a given action is taken. The given action typically is one of: providing an alert, labeling the detected information, applying a token to the detected information, and redacting the detected information.

Figure 5:
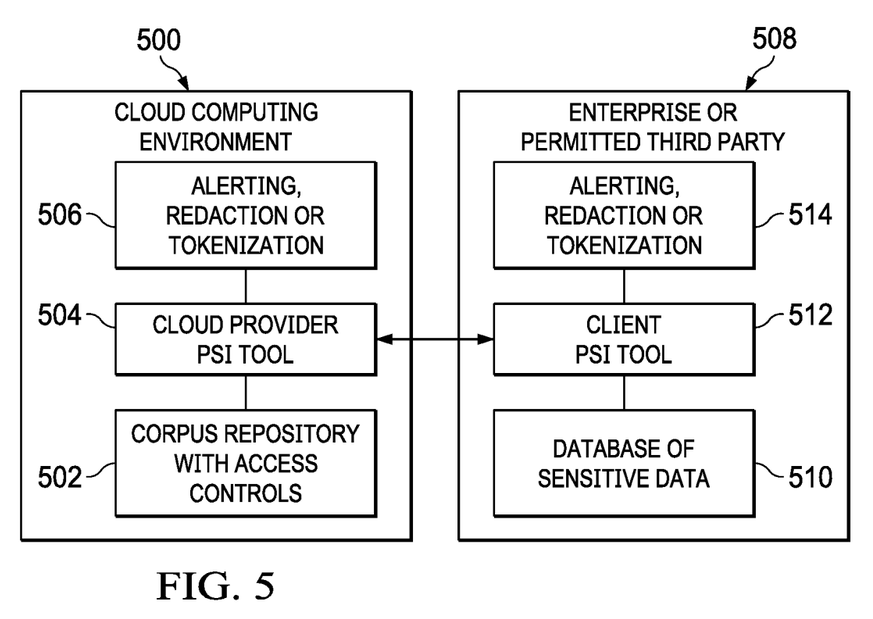
FIG. 5 depicts the basic technique of this disclosure.

FIG. 5 depicts the basic technique of this disclosure. In this example embodiment, cloud computing infrastructure 500 comprises a data store 502 that hosts a corpus repository, typically with access controls. The cloud provider executes a cloud provider Private Set Intersection (PSI) tool 504, in association with a response service 506 that provides responsive actions, such as one or more of: alerting, redaction, tokenization, labelling, sandboxing, and the like. Preferably, and as will be described, the data store 502 stores an entire set of content (information), although the tool 504 itself just operates on an index of that set of content. The enterprise computing environment 508, which typically is hosted in an enterprise private network, comprises a database 510 of sensitive data (e.g., PII, PHI, or the like), as well as an instances of both the PSI tool 512 and the response service 514. Enterprise-based resources communicate with cloud provider-based resources via client-server based communications, such as described above in FIG. 1. Each side of the communication link is implemented in one or more data processing systems, such as described and depicted in FIG. 2. The cloud computing infrastructure may be implemented as described in FIG. 3, and it may utilize one or more services such as Watson Assistant, in the manner described in FIG. 4. The client PSI tools (504 and 512) interoperate with one another to implement a PSI protocol exchange, with the cloud-based tool evaluating the index of the set of content stored in the cloud data store. The response services 506 and 514 typically execute as software (one or more computer systems, programs, processes, etc.) executing in hardware or virtual machines.

As noted above, the Private Set Intersection protocol, which is a form of secure multi-party computation (MPC), enables the two parties (the cloud provider, on the one hand, and the enterprise, on the other hand) to learn if they have a piece of information in common, and without either party having to reveal the compared information to the other party. With this approach, the index of an arbitrarily large corpus 502 in the cloud computing environment 500 is examined, preferably in an automated manner, and the response service(s) 506 and 514 flag or redact anything that is in the client's full, definitive list of sensitive data 510 (e.g., patient names and record numbers, or any other piece of information that the client considers sensitive) without revealing to the service provider any new information that is not already present on the cloud. In effect, this approach thus provides for a "zero knowledge"-based proof regarding whether sensitive data is or is not present on the cloud (in other words, in the index), all without disclosing such information to facilitate the evaluation process itself. In this approach, preferably the sensitive data never leaves the client premises 508; rather, the database 510 containing the sensitive data connects to the client-side agent 512, which performs Private Set Intersection (PSI) interactively with the cloud-supported PSI agent 504 (which, as noted above, preferably examines its index of the information stored in the cloud, rather than examining that entire set of information itself), thereby detecting, for example, whether sensitive data fields or any API field that enterprise users populate through a client application (not shown) from the client-side database 510 are present in any document or other object the cloud provider is permitted or allowed to access.

In a preferred embodiment, the cloud provider PSI tool (agent) 504 connects to the corpus repository 502 containing an indexed corpus. The PSI protocol then is performed on the contents of the index. This operation may include only a corpus specific to a particular client, or a broader corpus to which the client has access for sensitive information detection. This embodiment allows clients to determine whether their sensitive information exists, even in a corpus to which they do not have full (or even any) access, a provider-owned or curated corpus. As described with respect to FIG. 4, in this embodiment preferably the cloud provider-based PSI agent 504 integrates directly with the cognitive service APIs, performing PSI with the client's PSI agent in real-time to detect the passing of sensitive information in text fields as information enters the system. This embodiment thus allows the APIs (e.g., cognitive service APIs) to provide a real-time indication of apparent entry of sensitive data so that the client application can use the response service 506 (or the like) to warn the client or the end user and/or redact the data before it is stored on the cloud.

In an alternative embodiment, the PSI interaction is carried out between the cloud provider and a trusted third party (e.g., law enforcement, an intelligence agency, a contracted security organization, company auditors, authorized partners, etc.), where the trusted third party has a legitimate interest in detecting the presence of certain sensitive information, e.g., in a cognitive system, typically on behalf of the client. In this scenario, preferably the third party is not granted full access to the corpus or API, but still has a legitimate interest in detecting, for example, certain sensitive data (e.g., the names of persons of interest) in the cognitive system. Thus, as used herein, the access controls on the repository may be varied and will depend on the nature of the access limitation. Access controls may be role-based, user-based, or otherwise.

In one particular embodiment, the PSI tool on each side (i.e., on the cloud, and at the entity) implements a cryptographic protocol known as Garbled circuit. Garbled circuit provides a way to compile a program into a pair of programs each comprising a large number of logical gates. The two programs are configured to connect to one another, e.g., over a network, and collaboratively compute to generate an output (answer). Typically, the gates that compose the program are formed using a cryptographic primitive, such as oblivious transfer, which can be built using asymmetric cryptography, e.g., the Rivest Shamir Adelman (RSA) cryptosystem. In cryptography, an oblivious transfer (OT) protocol is a type of protocol in which a sender transfers one of potentially many pieces of information to a receiver, but the sender remains oblivious as to what piece (if any) has been transferred. In a representative implementation, each Garbled circuit program executes in a memory of a computing system, namely, in a first computing system in the cloud (FIG. 5, 500), and in a second computing system associated with the private entity (FIG. 5, 508). Using this approach, the end result is an overall program that executes in two halves simultaneously, and in such a way that no amount of looking into the contents of memory on either computing system allows determination of which logic path or data value the program is using at any moment, up until the program outputs a final answer to one or both parties.

The technique of this disclosure provides significant advantages. As has been described, the approach herein provides for a way to detect whether specific sensitive data of a client is present in a cloud computing infrastructure without requiring that data be shared with the cloud provider, or that the cloud provider provide the client access to all (or even any) data in the cloud. The approach enables sensitive data detection that does not require DLP or other complex systems to be supported in the enterprise, nor the training of a statistical classifier. The PSI-based approach is highly-secure, computationally-efficient, and ensures that sensitive data detection is facilitated with respect to those entities that have authorized rights to access the client database for the data detection. To this end, and as has been described each side of the communication preferably executes a PSI agent (tool), which is readily implemented in software.

As used herein, a PSI agent typically is implemented in software, e.g., as a set of computer program instructions executed by one or more hardware processors. A particular tool may comprise any number of programs, processes, execution threads, and the like, together with appropriate interfaces and databases to support data used or created by the tool. The tool may be configured or administered with a web-based front-end, via a command line, or the like. The tool may include one or more functions that are implemented programmatically, or that interoperate with other computing entities or software systems via an application programming interface (API), or any convenient request-response protocol As noted above, preferably the approach herein is implemented in association with various advanced services, such as a cognitive service. A representative cognitive service is IBM Watson, as has been described. Generalizing, a cognitive service of this type provides for processing of unstructured data sources, typically using a question and answer (Q&A) system, such as a natural language processing (NLP)-based artificial intelligence (AI) learning machine. A machine of this type may combine natural language processing, machine learning, and hypothesis generation and evaluation; it receives queries and provides direct, confidence-based responses to those queries. A Q&A solution such as IBM Watson may be cloud-based, with the Q&A function delivered "as-a-service" (SaaS) that receives NLP-based queries and returns appropriate answers.

A representative Q&A system, such as described in U.S. Pat. No. 8,275,803, provides answers to questions based on any corpus of data. The method described there facilitates generating a number of candidate passages from the corpus that answer an input query, and finds the correct resulting answer by collecting supporting evidence from the multiple passages. By analyzing all retrieved passages and that passage's metadata in parallel, there is generated an output plurality of data structures including candidate answers based upon the analyzing step. Then, by each of a plurality of parallel operating modules, supporting passage retrieval operations are performed upon the set of candidate answers; for each candidate answer, the data corpus is traversed to find those passages having candidate answer in addition to query terms. All candidate answers are automatically scored causing the supporting passages by a plurality of scoring modules, each producing a module score. The modules scores are processed to determine one or more query answers; and, a query response is generated for delivery to a user based on the one or more query answers.

In an alternative embodiment, the Q&A system may be implemented using IBM LanguageWare, a natural language processing technology that allows applications to process natural language text. LanguageWare comprises a set of Java libraries that provide various NLP functions such as language identification, text segmentation and tokenization, normalization, entity and relationship extraction, and semantic analysis.

The described approach is preferably web- or cloud-based, thereby avoiding traditional installation and deployment issues that often accompany DLP systems. The techniques provide for lightweight tooling (the client-server based PSI tool) to interact with the corpus (cloud-based) and the database (client-based) to detect potential sensitive data leakage. The approach thus promotes simple and effective cross-organization collaboration with sufficient privacy to alleviate or ameliorate security concerns.

As noted, the references herein to one or more commercial products or services are exemplary and should not be taken to limit the disclosed technique, which may be implemented on any system, device, appliance (or, more generally, machine) having the general characteristics and operating functionality that has been described.

This subject matter may be implemented as-a-service. As previously noted, and without limitation, the subject matter may be implemented within or in association with a cloud deployment platform system or appliance, or using any other type of deployment systems, products, devices, programs or processes. As has been described, the PSI tool and related response system functionality may be provided as a stand-alone function, or it may leverage functionality from other products and services.

A representative cloud application platform with which the technique may be implemented includes, without limitation, any cloud-supported application framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the generator service be executed by a particular component as named above, as the functionality herein (or any aspect thereof) may be implemented in other or systems.

The tool and response functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the sensitive data detection service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The Garbled circuit protocol (e.g., using oblivious transfer) as described herein is not intended to be limiting. Any cryptographic protocol that enables two-party secure computation in which two potentially mistrusting parties can jointly evaluate a function over their private inputs without the presence of a trusted third party may be used.

Further, Private Set Intersection is just a representative cryptographic protocol. As an alternative, a Private Search protocol may be used. In this embodiment, the corpus is indexed on the cloud and a check is performed to determine if one or more terms of interest to a requesting client are in the index.

The techniques herein provide for improvements to another technology or technical field, namely, data detection security analysis tools and systems, and cloud-based systems, as well as improvements to the functioning of automated sensitive data detection tools and methods.

Having described our invention, what is claimed is as follows:

1. A method to protect data in association with a cloud computing environment, the cloud computing environment comprising a data store in which a corpus of information is received and stored, comprising:
    identifying a first set of data associated with the corpus of information and private to the cloud computing environment, the first set of data being an index of the corpus of information;
    upon receipt of a request from an entity, the entity having a second set of data, the second set of data being sensitive data of interest to the entity and private to the entity, executing a cryptographic protocol with the entity to detect presence in the first set of data of any of the second set of data, wherein the cryptographic protocol is executed by evaluating a given cryptographic function over the first and second sets of private data without enabling the entity access to the corpus of information or the first set of private data; and
    upon detecting in the first set of data any of the second set of data, taking a given action;
    wherein the entity is a source of the second set of data and detecting any of the second set of data detects real-time passing of such data to the cloud computing environment from a private system associated with the entity.

2. The method as described in claim 1 wherein the cryptographic protocol is a Private Set Intersection (PSI) executed collaboratively in association with the entity.

3. The method as described in claim 2 wherein the given cryptographic function is a Garbled circuit implemented using an oblivious transfer cryptographic primitive.

4. The method as described in claim 1 wherein the entity is a third party government or private entity.

5. The method as described in claim 1 further including receiving the corpus of information from the entity via an application programming interface (API).

6. The method as described in claim 5 wherein the cryptographic protocol is executed during ingest of the corpus of information.

7. The method as described in claim 1 wherein the given action is one of: providing an alert, labeling any of the second set of data that has been determined to be present in the first set of data, applying a token to any of the second set of data that has been determined to be present in the first set of data, and redacting any of the second set of data that has been determined to be present in the first set of data.

8. An apparatus to protect data in association with a cloud computing environment, the cloud computing environment comprising a data store in which a corpus of information is received and stored, comprising:
    a processor;
    computer memory holding computer program instructions executed by the processor, the computer program instructions configured to:
        identify a first set of data associated with the corpus of information and private to the cloud computing environment, the first set of data being an index of the corpus of information;
        upon receipt of a request from an entity, the entity having a second set of data, the second set of data being sensitive data of interest to the entity and private to the entity, execute a cryptographic protocol with the entity to detect presence in the first set of data of any of the second set of data, wherein the cryptographic protocol is executed by evaluating a given cryptographic function over the first and second sets of private data without enabling the entity access to the corpus of information or the first set of private data; and
        upon detecting in the first set of data any of the second set of data, take a given action;
        wherein the entity is a source of the second set of data and detecting any of the second set of data detects real-time passing of such data to the cloud computing environment from a private system associated with the entity.

9. The apparatus as described in claim 8 wherein the cryptographic protocol is a Private Set Intersection (PSI) executed collaboratively in association with the entity.

10. The apparatus as described in claim 9 wherein the given cryptographic function is a Garbled circuit and the computer program instructions are configured to implement an oblivious transfer cryptographic primitive.

11. The apparatus as described in claim 8 wherein the entity is a third party government or private entity.

12. The apparatus as described in claim 8 wherein the computer program instructions are further configured to receive the corpus of information from the entity via an application programming interface (API).

13. The apparatus as described in claim 12 wherein the cryptographic protocol is executed during ingest of the corpus of information.

14. The apparatus as described in claim 8 wherein the computer program instructions configured to take the given action include computer program instructions that provide an action that is one of: provide an alert, label any of the second set of data that has been determined to be present in the first set of data, apply a token to any of the second set of data that has been determined to be present in the first set of data, and redact any of the second set of data that has been determined to be present in the first set of data.

15. A computer program product in a non-transitory computer readable medium for use in a data processing system to protect data in association with a cloud computing environment, the cloud computing environment comprising a data store in which a corpus of information is received and stored, the computer program product holding computer program instructions that, when executed by the data processing system, are configured to:
- identify a first set of data associated with the corpus of information and private to the cloud computing environment, the first set of data being an index of the corpus of information;
- upon receipt at the cloud computing environment of a request from an entity, the entity having a second set of data, the second set of data being sensitive data of interest to the entity and private to the entity, execute a cryptographic protocol with the entity to detect presence in the first set of data of any of the second set of data, wherein the cryptographic protocol is executed by evaluating a given cryptographic function over the first and second sets of private data without enabling the entity access to the corpus of information or the first set of private data; and
- upon detecting in the first set of day any of the second set of data, take a given action;
- wherein the entity is a source of the second set of data and detecting any of the second set of data detects real-time passing of such data to the cloud computing environment from a private system associated with the entity.

16. The computer program product as described in claim 15 wherein the cryptographic protocol is a Private Set Intersection (PSI) executed collaboratively in association with the entity.

17. The computer program product as described in claim 16 wherein the given cryptographic function is a Garbled circuit and the computer program instructions are configured to implement an oblivious transfer cryptographic primitive.

18. The computer program product as described in claim 15 wherein the entity is a third party government or private entity.

19. The computer program product as described in claim 15 wherein the computer program instructions are further configured to receive the corpus of information from the entity via an application programming interface (API).

20. The computer program product as described in claim 19 wherein the cryptographic protocol is executed during ingest of the corpus of information.

21. The computer program product as described in claim 15 wherein the computer program instructions configured to take the given action include computer program instructions that provide one of: an alert, label any of the second set of data that has been determined to be present in the first set of data, apply a token to any of the second set of data that has been determined to be present in the first set of data, and redact any of the second set of data that has been determined to be present in the first set of data.

* * * * *